United States Patent Office 3,279,918
Patented Oct. 18, 1966

3,279,918
ELECTROPHOTOGRAPHIC MATERIAL
Paul Maria Cassiers, Jean Marie Nys, and Jozef Frans Willems, Mortsel-Antwerp, Belgium, assignors to Gevaert Photo-Producten N.V., Mortsel, Belgium, a Belgian company
No Drawing. Filed Feb. 4, 1960, Ser. No. 6,627
Claims priority, application Great Britain, Feb. 5, 1959, 4,147/59; Belgium, Dec. 11, 1959, 39,426/59, Patent 585,555
2 Claims. (Cl. 96—1)

The present invention relates to an electrophotographic material, and more particularly to an electrophotographic material consisting of a support and a photoconductive layer which contains an organic photoconductive substance or which consists of an organic photoconductive substance.

Electrophotographic materials are already known which consist of a support and a photoconductive layer containing as photoconductor an inorganic substance such as selenium or zinc oxide or an organic substance such as anthracene, benzidine or a heterocyclic compound of a determined type.

Now we have found that electrophotographic material with particularly favorable properties and suitable to be used in the application of the most widely varying electrophotographic reproduction methods is obtained if in the manufacture of the photoconductive layer compounds are used having the general formula:

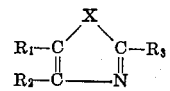

wherein:

$X$ = an oxygen or sulphur atom, a methylene or N—R— radical wherein R is a hydrogen atom or an alkyl radical either substituted or not;

$R_1$ and $R_2$ = each a hydrogen atom, an alkyl or aryl radical either substituted or not, or together the missing atoms necessary to close an arylene nucleus either substituted or not; and $R_3$ = a hydrogen atom, an alkyl, aryl or heterocyclic radical either substituted or not, with the understanding that at most one of the symbols $R_1$, $R_2$ and $R_3$ represents a hydrogen atom or an alkyl radical either substituted or not.

Some compounds according to the above formula, which seemed to be particularly suitable for the manufacture of the electrophotographic material according to the present invention are given hereinafter in Table 1.

TABLE 1

| Compound | X | $R_1$ | $R_2$ | $R_3$ | Prepared according to— | M.P., °C. |
|---|---|---|---|---|---|---|
| 1 | $CH_2$ | |  | —$CH_3$ | | 59 |
| 2 | O |  | H | 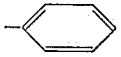 | E. Fischer, Ber. 29 (1896), 205. | |
| 3 | O | 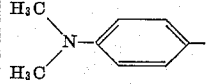 | H | 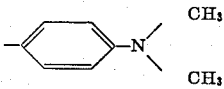 | | |
| 4 | O | 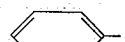 | H | 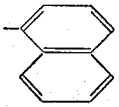 | J. Lister & R. Robinson, J. Chem. Soc. 101 (1912) 1306. | |
| 5 | O |  | H | 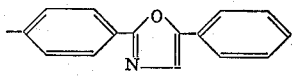 | F. Newton Hayes et al., J. Am. Chem. Soc. 77 (1955) 1850. | |
| 6 | O | |  | 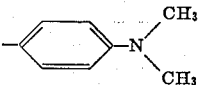 | U.S.P. 2.793.192 | |
| 7 | O | | 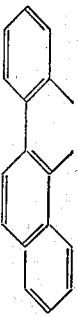 | 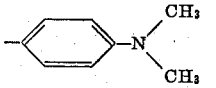 | B. Schiedt, J. prakt. Chem. 157 (1941) 221. | |

TABLE 1—Continued
| Compound | X | R₁ | R₂ | R₃ | Prepared according to— | M.P., °C. |
|---|---|---|---|---|---|---|
| 8 | O | | 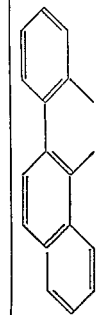 |  | | |
| 9 | NH | 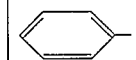 | 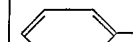 | H | O. Davidson et al., J. Org. Chem. 2 (1938) 327. | |
| 10 | NH | 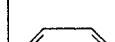 | 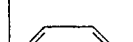 | CH₃ | Ibid | |
| 11 | NH | 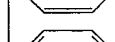 | 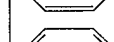 | 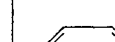 | Ibid | |
| 12 | NH | 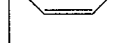 | 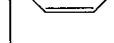 | 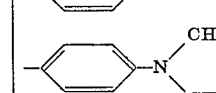 | | 257 |
| 13 | NH |  |  | 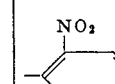 | A. H. Cook & D. G. Jones, J.C.S. 1941, 282. | |
| 14 | NH |  |  | 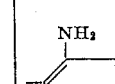 | Ibid | |
| 15 | NH | 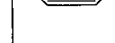 | 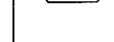 | 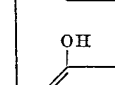 | A. H. Cook & D. G. Jones, J.C.S. 1941, 281. | |
| 16 | NH | 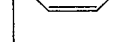 | 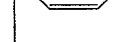 | 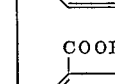 | | 260 |
| 17 | NH | 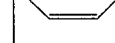 | 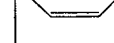 | 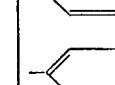 | B. Radziszewski, Chem. Zentr. I (1909) 1883-4. | |
| 18 | NH | 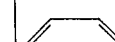 |  | 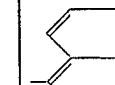 | | 232–233 |
| 19 | NH | 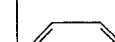 | 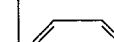 | 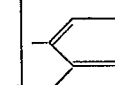 | | >260 |
| 20 | NH | 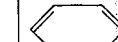 | 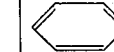 | 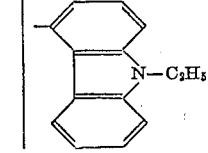 | | 263 |

3,279,918
TABLE 1—Continued
| Compound | X | R₁ | R₂ | R₃ | Prepared according to— | M.P., °C. |
|---|---|---|---|---|---|---|
| 21 | NH |  |  | 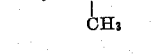 | | >260 |
| 22 | NH |  | 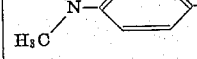 | H | H. Bredereck & Theibig, Ber. 86 (1953) 94. | |
| 23 | NH |  | 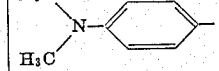 | CH₃ | | 120 |
| 24 | NH |  | 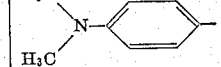 | 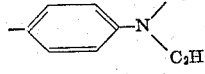 | | 222 |
| 25 | NH |  | 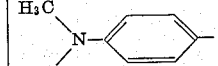 | 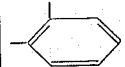 | | |
| 26 | NH |  | 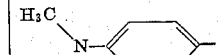 | 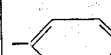 | | >260 |
| 27 | NH |  |  | 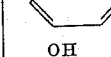 | | 218 |
| 28 | NH |  | 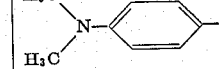 | 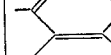 | | >260 |
| 29 | NH |  | 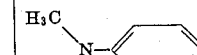 | 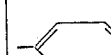 | | 99 |
| 30 | NH |  | 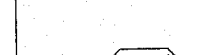 | 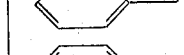 | | 98 |
| 31 | NH | 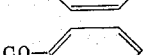 | 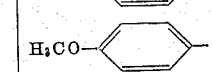 | 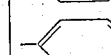 | | |
| 32 | NH |  |  | 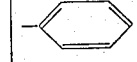 | | >260 |
| 33 | NH | | 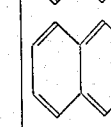 | 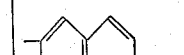 | D. Jerchel et al., Ann. 575 (1952) 162–73. | |
| 34 | NH | | 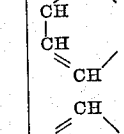 | 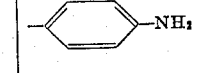 | G. Leandri et al., Gazz. Chim. Ital. 85 (1955) 780. | |
| 35 | NH | | 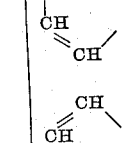 |  | H. Boganz, Angew, Chem. 68 (1956) 151–2. | |

TABLE 1—Continued

| Compound | X | R₁ | R₂ | R₃ | Prepared according to— | M.P., °C. |
|---|---|---|---|---|---|---|
| 36 | NH | | 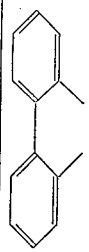 | 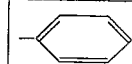 | E. A. Steck & A. R. Day J. Am. Chem. Soc. 65 (1943) 452-6. | |
| 37 | NH | | 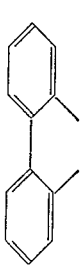 | 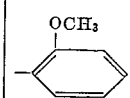 | Ibid | |
| 38 | S | H | 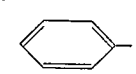 | 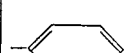 | Ann. 259, 237 | |
| 39 | S | 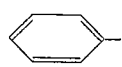 | H | 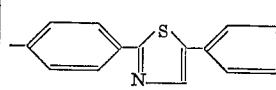 | British Specification 722.543. | |
| 40 | S | | 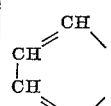 | 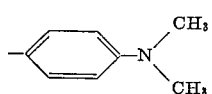 | U.S.P. 2.793.192 | |
| 41 | S | | 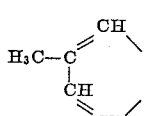 | 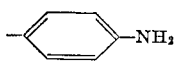 | Fierz-David H. A., Fundamental Processes of Dye Chemistry p. 333 (1949), Interscience Publishers, New York. | |
| 42 | S | | 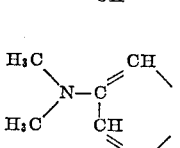 |  | U.S.P. 2.793.192 | |

Compound 3 is prepared by refluxing for about 6 hours at N-(p-dimethylaminobenzoyl)-p-dimethylaminophenacylamine solution in an excess of phosphorus oxychloride until no hydrochloric acid vapors evolve any more. Next, the excess of phosphorus oxychloride is distilled off on water-bath and the residue is treated with ice-cold water. The yellow-orange solution is slightly alkalized whereafter the formed precipitate is sucked off. This precipitate is washed with water and in the presence of active carbon recrystallized from a mixture of piperidine and water. A yellow product melting at 219–220° C. is obtained.

Compound 4 is also prepared by treating an anhydrous etheric solution of equimolar amounts of alpha-naphthaldehyde and benzaldehyde cyanohydrin with dry hydrochloric acid gas in order to precipitate the oxazole hydrochloride. If no further precipitate is formed any more, the hydrochloride is quickly sucked off, washed with a little anhydrous ether and next dissolved in alcohol. By addition of water to this solution the free oxazole precipitates. It is finally sucked off, washed with water, dried and recrystallized from hexane. Melting point: 110° C.

Compound 7 is also prepared by boiling up for 2 hours 7.8 g. of chrysoquinone, 4.5 g. of p-dimethylaminobenzaldehyde and 24 g. of crystallized ammonium acetate in 200 cm.³ of acetic acid. The precipitate formed is sucked off and recrystallized from benzene. Melting point: 285° C.

Compound 8 is prepared as compound 7 but 4.5 g. of p-dimethylaminobenzaldehyde is replaced by 7 g. of 5-acenaphthaldehyde and the recrystallization of the precipitate formed occurs from xylene. Melting point: above 260° C.

The compounds 12, 13, 15–32, 36 and 37 can be prepared according to O. Davidson, M. Weiss and M. Jelling, J. Org. Chem. 2 (1938), 325–6. For some of these compounds similar or other methods of synthesis are given in Table 1.

Compound 14 is obtained by catalytic hydrogenation under pressure and at about 40° C. of compound 13 dissolved in acetic acid. Melting point: 217–218° C.

For the manufacture of the electrophotographic material according to the present invention, a photoconductive layer containing at least one of the compounds according to the above general formula or mainly consisting of at least one of the compounds according to the above general formula is applied to a suitable support.

The photoconductive layers according to the present invention can contain besides one or more of the compounds according to the above general formula still one or more other photoconductive compounds with similar or different photoelectric, mechanical or other physical properties; moreover, there can be present in the photoconductive layer other compounds which confer the properties desired to the photoconductive layer and/or to the composition wherefrom this layer is formed.

Thus, in the manufacture of the photoconductive layers according to the present invention one or more macromolecular compounds can be added as binding agents to the composition wherefrom the photoconductive layer is formed; preferably, macromolecular compounds with high specific resistivity (i.e., with a specific resistivity higher than $10^9$ ohm-cm.) are used for this purpose; macromolecular compounds particularly suitable as binding agent for the photoconductive layers are e.g., natural resins, such as dammar resin, elemi-resins, gum arabic, manila gum and sandarac resin; micro-crystalline waxes; modified natural substances such as cellulose diacetate and cellulose triacetate, cellulose acetobutyrate, ethyl cellulose, ethyl cellulose stearate or other cellulose derivatives pentaerythrite polyesters or other modified colophonium resins and ester gums; polymerizates such as polyethylene, polystyrene and copolymers of styrene, polyvinylacetate and copolymers of vinyl acetate, polyvinyl acetals of formaldehyde, acetaldehyde, butyraldehyde, polyacrylic acid esters and polymethacrylic acid esters and coumarone-indene resins; and polycondensates such as glycerol-phthalate resins and other glyceryl polyesters, alkyd resins, polyethylene glycol esters, diethylene glycol polyesters, formaldehyde resins and silicone resins; particularly good results can be attained by using the polyesters described in U.S. patent application Serial No. 702,252, filed December 12, 1957, now abandoned, and polysulphonates such as described in U.S. patent application Serial No. 797,587, filed March 3, 1959, now abandoned.

In the choice of a suitable binding agent one is not limited to previously polymerized compounds; indeed, also low molecular compounds can be used or mixtures of low and high molecular compounds, or semi-polymerizates which are polymerized or condensed in situ or undergo cross-linking according to one of the methods known in polymer chemistry.

If desired, suitable plasticizers such as dibutylphthalate, dimethylphthalate, dimethylglycolphthalate, tricresylphosphate, triphenylphosphate, monocresyldiphenylphosphate, etc., in quantities amounting to 10 to 30% by weight of the amount of binding agent used can be added to the compositions for the formation of the photoconductive layers containing a binding agent.

Further can still be used other additives well known in the coating technique such as for instance pigments, compounds which influence the gloss and/or the resistivity, compounds which counteract the aging and/or the oxidation or which influence the thermal stability of the layers. In the choice of these additives, those are preferred which do not substantially reduce the dark-resistivity of the photoconductive layer.

The thickness of the layers is not critically established but is determined by the requirements of each separate case. Good results are attained with electrophotographic layers the thickness of which varies between 1 and 20μ and preferably between 3 and 10μ, for layers which are too thin possess an insufficient insulating power whereas layers which are too thick require long exposure times.

Finally, according to the present invention compounds which themselves may or may not possess photoconductive properties and which cause an increase of the general sensitivity and/or of the sensitivity to electromagnetic rays from a determined part of the spectrum can also be present in the photoconductive layers.

Thus, for instance the general sensitivity and/or the sensitivity to electromagnetic rays from the visible part of the spectrum can markedly be increased by adding to the photoconductive layer one or more compounds selected from one or more of the following classes, preferably in an amount of 0.1 to 5% in respect of the weight of compound used as photoconductor according to the above general formula.

A. Triarylmethane dyestuffs without ring closure, i.a.:
(1) Those according to the general formula

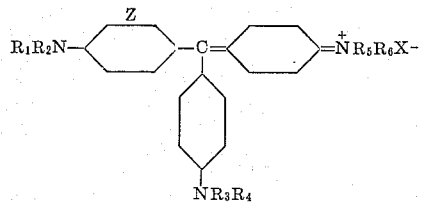

wherein $R_1$, $R_2$, $R_3$, $R_4$, $R_5$, $R_6$ and Z each represents a hydrogen atom or a methyl group and X a hydroxyl group or a chlorine atom, such as for instance Fuchsine (C.I. 42510), Waxoline Red A25 (C.I. 42510B), Crystal Violet (C.I. 42555) and Crystal Violet Base (C.I. 42555B);

(2) Those according to the general formula

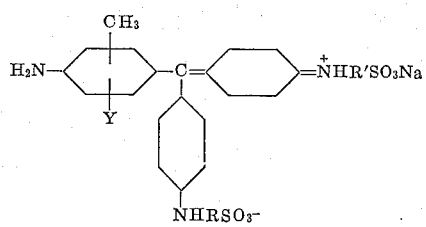

wherein R and R' represent a phenyl or naphthyl group and Y a hydrogen atom or —$SO_3Na$, such as for instance Bleu Pur (C.I. 42755) and Cotton Brilliant Blue 8B (C.I. 42700);

(3) Those according to the general formula

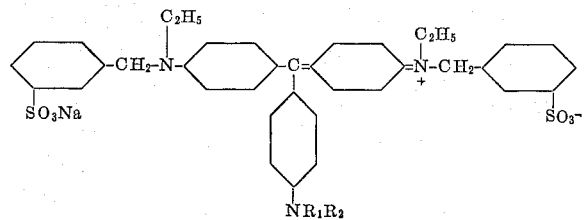

wherein $R_1$ and $R_2$ each represent a methyl or ethyl group such as for instance Brilliant Wool Blue FFR Extra (C.I. 42735) and Acid Violet 5B (C.I. 42650);

(4) Those according to the general formula

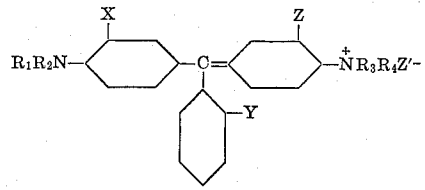

wherein $R_1$, $R_2$, $R_3$ and $R_4$ each represent a hydrogen atom, a methyl or ethyl group;

X and Z each represent a hydrogen atom or a methyl group;

Y represents a hydrogen or a chlorine atom; and

Z' represents a chloride or bisulphate ion;

such as for instance Malachite Green, Malachite Green J3 ES, Malachite Green Crystals conc., Victoria Green Du Pont (all C.I. 42000), Brilliant Green, Diamond Green CX (both C.I. 42040), Blue Astrazon G (C.I. 42025) and Brilliant Glacier Blue (C.I. 42140);

(5) Those according to the general formula

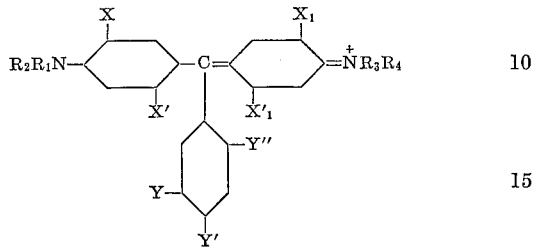

wherein $R_1$ and $R_3$ each represent an hydrogen atom or an ethyl group;

$R_2$ represents an ethyl, a benzyl or a p- or m-sodium sulphobenzyl group;

$R_4$ represents an ethyl, a benzyl, a p- or m-sodium sulphobenzyl or a p- or m-sulphobetaine benzyl group;

X, X', $X_1$ and $X'_1$ each represent an hydrogen atom or a methyl group;

Y represents an hydrogen atom, a hydroxyl group or a 2,4-dinitrophenylamino group;

Y' represents an hydrogen atom, a phenylamino group, a sulphonic acid group which can be converted into its alkali or earth alkali salt form or a sulphobetaine group, such as for instance Bleu Neptune BGX (Schultz 826), Alkali Fast Green BBF (C.I. 42050), Bleu Kiton A (C.I. 42052), Patent Blau V (C.I. 42045), Cyanol Extra (C.I. 42135), Bleu Xylène AS (C.I. 42080), Patentgrün VS, Naphthalene Green G, D à C Green No. 1, Acid Green S, Acid Green, Vert à l'Acide, Vert Acide haute conc., Vert Acilan B (all C.I. 42085), Vert Acide G, Lichtgrün SF gelblich, Vert. Acide GG 227–B, Vert Acide GG Extra, Säure Grün GG, Vert Lumière SF conc., Vert Lumière SF and Vert Acilan SFG (all C.I. 42095);

(6) Those according to the general formula

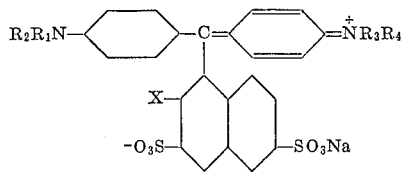

wherein $R_1$, $R_2$, $R_3$ and $R_4$ each represent a methyl or ethyl group,
X represents an hydrogen atom or a hydroxyl group, such as for instance Wool Green S, Green S conc. (both C.I. 44090) and Vert Xylène Solide B (C.I. 44025);

(7) Further Acid Magenta A220 (XB) (C.I. 42685) and Chrome Azurol S (C.I. 43825).

B. Triarylmethane dyestuffs with ring closure, i.a.
(1) Those according to the general formula

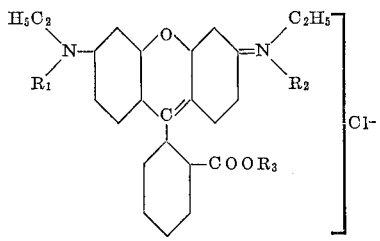

wherein $R_1$, $R_2$ and $R_3$ each represent an hydrogen atom or an ethyl group, such as for instance Rhodamine G extra (C.I. 45150), Rhodamine B (C.I. 45170), Rouge Fanal 6B Supra pâte en Rouge Fanal Supra poudre (both C.I. 45175);

(2) Those according to the general formula

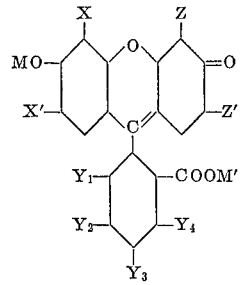

wherein

M and M' each represent an hydrogen, sodium or potassium atom,

X and Z each represent an hydrogen, bromine or iodine atom or a hydroxyl group;

X' and Z' each represent an hydrogen, bromine or iodine atom;

$Y_1$, $Y_2$, $Y_3$ and $Y_4$ each represent an hydrogen or chlorine atom;

such as for instance Erythrosine Blaulich (C.I. 45430), Rose Bengale N, Rose Bengale Double conc. and Rose Bengale (all C.I. 45440), Gallein MS (C.I. 45445), Phloxin BBN (C.I. 45410 A), Erythrosine (C.I. 45430) and Fluoreszein Natrium (C.I. 45350);

(3) And further Rouge Acide XB (C.I. 45100) and Oxanal Violet A 2R (C.I. 45190).

C. Diarylmethane dyestuffs with ring closure such as for instance Rhodamin S (C.I. 45050), Orange Acridine Brillante EZ and Acridine Orange NO (both C.I. 46005).

D. Polymethine dyestuffs:
(1) Styryl dyestuffs such as for instance Astrazone Pink FG (C.I. 48015), 1-benzyl-2-[beta-(p-dimethylaminophenyl)-vinyl]-pyridiniumchloride,
1-ethyl-4-[beta-(3-N-ethylcarbazyl)-vinyl]-quinolinium-chloride,
methyl-bis{p-[beta-(1'-beta'-hydroxyethyl-2'-quinolinium-chloride)-vinyl]-phenyl}-amine,
1-phenyl-2-methyl-3,5-bis[beta-(p-dimethylaminophenyl)-vinyl]-pyrazolium iodide,
2-[beta-(p-dimethylaminophenyl)-vinyl]-3-methyl-o-nitrobenzthiazolium-p-tolusulphonate and
1-ethyl-2-[beta-(p-dimethylaminophenyl)-vinyl]-quinolinium iodide;

(2) Hemicyanine dyestuffs such as for instance

2-{beta[p-(p'-dimethylaminobenzylidene imino)-phenylamino]-vinyl}-3-ethyl-benzoxazolium iodide;

(3) Monomethane dyestuffs according to the general formula

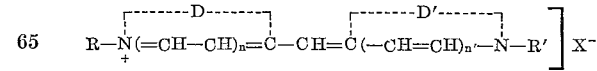

wherein

D and D' represent the metalloide atoms necessary for closing equal or different 5- or 6-membered heterocyclic rings, n and n' represent 0 or 1, R and R' represent an alkyl group, and $X^-$ represents an anion, such as for instance Pinachrom, Pinachrom Violett (both C.I. 807), 1,1'-diethyl-2,2'-cyanine iodide, {3-methylbenzthiazole}-{3-ethylnaphtho-[1',2',4,5]-thiazole}-monomethinecyanine-p-tolusulphonate and 1,1'-diethyl-4,4'-cyanine iodide;

(4) Trimethine dyestuffs according to the general formula

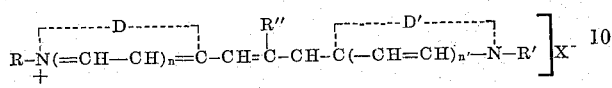

wherein

D and D' represent the metalloide atoms necessary for closing equal or different 5- or 6-membered heterocyclic rings, n, n', R and R' represent the same value as above, R" represents an hydrogen atom or an alkyl group, and X⁻ represents an anion, such as for instance 1,1'-diethyl-4,4'-carbocyanine iodide, (3-ethylbenzthiazole)-(1-ethyl - 4 - quinoline)-trimethinecyanine iodide, Astraphloxine FF extra (C.I. 48070) and bis[1,2-di-(3'-benzthiazolyl)-ethylene]-bis - (mesomethyl-trimethinecyanine)-p-tolusulphonate;

(5) Oxonol-dyestuffs such as for instance [1-(p-sulphophenyl)-3-methyl - 5 - pyrazolone]-alpha-methyl-trimethineoxonol;

(6) Merostyryl dyestuffs such as for instance 2,6-di-(o-hydroxybenzylidene)-cyclohexanone, 3,5-di(p-dimethylaminobenzylidene) - tetrahydrothiopyranone-1-dioxide and 2,6-di-(p-dimethylaminobenzylidene)-cyclohexanone;

(7) Merocyanine dyestuffs such as for instance [3-ethylbenzthiazole]-[2'-thio-3'-ethylthiazolidine - 2',4' - dione]-(o)-methinemerocyanine, [3 - ethyl - benzthiazole]-[3'-ethyl-4'-dicyanomethylidene-thiazolidine - 2'-one]-dimethinemerocyanine and [3-ethylbenzthiazole]-[2' - thio - 3'-ethylthiazolidine-2',4'-dione]-dimethinemerocyanine;

(8) Open carocyanine dyestuffs according to the general formula

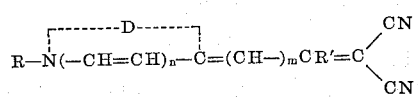

wherein

D represents the matalloide atoms necessary for closing a 5- or 6-membered heterocyclic ring, n and R represent the same value as above, m represents 1 or 3, and R' represents an hydrogen atom, an alkyl- or an aryl group, such as for instance 2-(2'-methyl-3,3'-dicyanopropenylidene)-3-ethyl-4,5-diphenyl-(2H)-thiazoline, 2-(2'-phenyl-3,3'-dicyanopropenylidene)-3-methyl-4,5-diphenyl-(2H)-thiazoline, 2-(2'-methyl-3',3'-dicyanpropenylidene)-3-methyl-6-dimethylamino-(2H)-benzthiazoline, 2-(3',3'-dicyanpropenylidene)-3-methyl - 6 - dimethylamino-(2H)-benzthiazoline, 2-(3',3'-dicyanpropenylidene)-3 - ethyl - (2H)-benzthiazoline and 2-(3',3'-dicyanpropenylidene)-3-ethyl-(2H)-benzselenazoline, 2-(4'-phenyl-5',5'-dicyanpentadienylidene)-3-ethyl-(2H)-benzselenazoline and 2-(4'-phenyl-5',5'-dicyanpentadienylidene)-3-ethyl-(2H)-benzthiazoline.

E. Azenium dyestuffs i.a.:

(1) According to the general formula

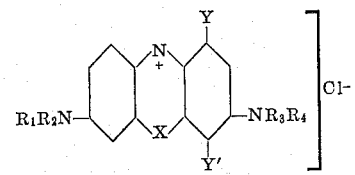

wherein $R_1$, $R_2$, $R_3$ and $R_4$ each represent an hydrogen atom, a methyl or ethyl group, X represents an oxygen- or sulphur atom or a phenyl substituted nitrogen atom, Y represents a hydrogen atom or a carbethoxy group, and Y' represents an hydrogen atom or a nitro group, such as for instance Zapon Fast Blue 3G (C.I. 51005), Zapon Fast Green GG (mixing dyestuff C.I. 51005 and C.I, 10445), Thionin (C.I. 52000), Aniline Vert Methylene B extra (C.I. 52050), Methylenblau (chlorzinkfrei) (C.I. 52015) and Phenosafranin (C.I. 840);

(2) Other azenium dyestuffs such as for instance 3-formyl-10-methylphenothiazine, Janus Grün B (C.I. 11050) and Indulin Scharlach (C.I. 50080).

F. Azo dyestuffs such as for instance Jaune Oxanal GR (C.I. 13900) and Orange Sulfonine OS (C.I. 23260) and formazane dyestuffs such as those according to the general formula

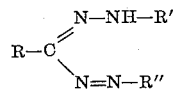

wherein

R represents an hydrogen atom, a methyl, d-glucosyl, phenyl or pyridyl group,

R' represents a phenyl or hydroxyphenyl group, and

R" represents a phenyl, carbomethoxyphenyl or naphthyl group, such as for instance 1,3-diphenyl-5-(1'-naphthyl)-formazane, 1,5-diphenyl-3-methylformazane, 1,5-diphenylformazane, 1,5-diphenyl-3-(d-glucosyl)-formazane, 1,3,5-triphenylformazane, 1 - (o - hydroxyphenyl)-3,5-diphenylformazane and 1,5-diphenyl-3-(4'-pyridyl)-formazane; and such as 1,1'-p-(di-o-methoxy)-diphenylene-3,3'- 4"-pyridyl)-5,5'-diphenyldiformazane.

G. Anthraquinone dyestuffs, i.a. those according to the general formula

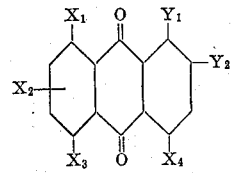

wherein $X_1$ represents an hydrogen atom or a hydroxyl group, $X_2$ represents an hydrogen atom or a sodium sulphonate group, $X_3$ represents an hydrogen atom, a hydroxyl group or a p-methyl-o-sodium sulphonate-phenylamino group, $Y_1$ represents a hydroxyl, nitro, amino, beta-hydroxyethylamino, cyclohexane amino or p-methyl-o-sulphophenyl group, $Y_2$ represents an hydrogen or chlorine atom or a hydroxyl group, $Y_3$ represents an hydrogen or chlorine atom, and $Y_4$ represents an hydrogen atom, a hydroxyl, amino, beta-hydroxyethylamino, o-sulphophenylamino, p-methyl-o-sulphophenylamino or p-acetamido-anilino group, such as for instance 1-nitro-anthraquinone, Vert Alizarine Solide G and Vert Alizarine Cyanine E (both C.I. 61570), Alizarine Irisol R (C.I. 60730), Alizarine Irison RL (C.I. 62010), Vert solide à l'alcool G (C.I. 62565), Vert Bleu Celliton Solide B and Vert Bleu Artisile Direct GF (both C.I. 62500), Alizarin and Alizarinrot (both C.I. 58000), Alizarincyanid Grün 5G (C.I. 62560), Vert Alizarin Cyanine 3G (C.I. 62550), Vert Supramine FB (C.I. 62515), Vert d'Alizarine Lumière GS (C.I. 61570), Toluidinblau (C.I. 63340) and Quinizarine techn. (C.I. 58050).

H. Indigo dyestuffs such as for instance Indigotine I (C.I. 73015).

I. Vinylene compounds such as for instance 1-(2-pyridyl)-2-(4'-pyridyl)-ethylene, 1-(3-pyridyl)-2-(4'-pyridyl)-ethylene, 1-(2-pyridyl)-2-(3'-pyridyl)-ethylene, 1,2-di-(4'-pyridyl)-ethylene and 1,2-di-(2'-pyridyl)-ethylene, and the stilbene compounds the use of which in photoconductive layers is the object of the copending patent application Serial No. 6,625, now U.S. Patent No. 3,158,475, for "Electrophotographic Material," filed on even date herewith, for instance 4-amino-4'-methoxystilbene.

J. Polycyclic dyestuffs such as for instance Jaune d'Or Indigosal IRK (C.I. 59106).

K. Compounds such as 2,4-dichlorobenzoic acid, 3,4-dichlorobenzoic acid, o-oxybenzyl-beta-naphthylamine, N - (p-dimethylaminobenzoyl)-p-dimethylaminophenacylamine, p-dimethylaminocinnamic acid.

L. Imidazo-(1,2-b)-1,2,4-triazine compounds such as 3,6-diphenylimidazo - (1,2 - b) - 1,2,4-triazine, 2,3,6-triphenylimidazo-(1,2-b)-1,2,4-triazine.

M. Quinoxaline compounds such as 2-(p-dimethylaminophenyl)-3-phenyl-quinoxaline and 6,7-diphenyl-2,4-dihydroxy-pteridine.

N. Triazoles, such as for instance 2-(p-sulphophenyl sodium salt)-naphtho[1,2-d]-1,2,3-triazole. Particularly favorable results could be attained by the use of the compound 12 of the above Table 1 together with one of the above mentioned triazines or quinoxalines, or together with compound 42 of the above Table 1.

O. Polycyclic hydrocarbons, such as fluorenone and 4-amino-fluoranthrene.

In the manufacture of the electrophotographic material according to the present invention is preferably used as support for the photoconductive layer an electrically conductive plate or sheet, or an insulating plate or sheet provided with an electrically conductive layer. Under electrically conductive plate, sheet or layer is understood a plate, sheet or layer the specific resistivity of which is smaller than that of the photoconductive layer, i.e. in general smaller than $10^9$ ohm-cm. Supports the specific resistivity of which is smaller than $10^9$ ohm-cm. are preferably used.

Suitable insulating plates are e.g. glass plates; these plates must be coated with a conductive layer, e.g. with a transparent layer of silver, gold or stannous oxide deposited thereon e.g. by vacuum evaporation.

Suitable insulating sheets are for instance films of synthetic macromolecular substances with high specific resistivity such as for instance the polysulphonates described and claimed in the copending patent application Serial No. 797,587 for "Production of Linear Aromatic Polyesters," filed March 6, 1959, polyesters such as those described and claimed in the copending patent applications Serial No. 702,252 for "Production of Linear Aromatic Polyesters," filed December 12, 1957, Serial No. 725,498 for "Production of Linear Aromatic Polyesters," filed April 1, 1958, now Patent No. 3,028,364, Serial No. 731,874 for "Production of Linear Aromatic Polyesters," filed April 30, 1958, now Patent No. 3,216,970, polystyrene, polyethylene, cellulose esters etc. or sheets of paper with high specific resistivity. The insulating sheets must be provided with a conductive layer e.g. a thin metal sheet, with a layer comprising a metal powder dispersed in the smallest possible amount of binding agent, or with a thin hydrophilic layer comprising a hygroscopic and/or antistatic compound and a hydrophilic binding agent. Suitable hygroscopic and/or antistatic compounds are for instance glycerine, glycol, polyethylene glycols, calcium chloride, sodium acetate, condensation products of maleic acid and polyethylene glycols, citric acid amides, hydroxypropyl sucrosemonolaurate, quaternary ammonium compounds amine salts of lyophilic alkylphosphates, lyophilic dialkylpolyoxyalkylene phosphates and polyoxyalkyleneamides. Suitable hydrophilic binding agents are for instance gelatin, glue, polyvinyl alcohol, methylcellulose, carboxymethylcellulose, cellulose sulphate, cellulose hydrogen phthalate, cellulose-acetatesulphate, hydroxyethyl cellulose, polyacrylic acid or colloidal silica; for obtaining a good adhesion of the hydrophilic layer and the hydrophobic polymeric sheet, the polymeric sheet can be provided with a suitable subbing layer such as for instance one of the subbing layers described in the copending patent application Serial No. 509,333, for "Manufacture of Photographic Film," filed May 18, 1955, now Patent No. 2,984,569, (for polyester films), the British Patent 819,592, the copending patent application Serial No. 826,129, for "Subbing Method for Polyalkylene Materials" filed July 10, 1959, now abandoned, and the Belgian Patent No. 569,129 (for polyalkylene films), U.S.P. 2,867,542 (for cellulose ester films), and the Belgian Patent No. 573,005 (for hydrophilic layers with polyvinyl alcohol as binding agent).

Suitable conductive plates are for instance plates of metals such as aluminum, zinc, copper, tin, iron or lead.

Suitable conductive sheets are for instance films made of polymeric substances with low specific resistivity such as for instance polyamide films or paper sheets with low specific resistivity. Good results can be attained by using paper sheets containing hygroscopic and/or antistatic substances as described above. These hygroscopic and antistatic substances are preferably incorporated into the paper sheets during the paper manufacturing process either by adding them to the paper pulp or by an after-treatment, before or after calendering the paper sheets. These substances can likewise be incorporated into the paper sheets by applying to the raw paper stock a composition containing the hygroscopic and/or the antistatic substances and a hydrophilic binding agent as described above.

It was likewise stated that particularly good results are attained when using paper sheets provided with a coating of a polymeric substance in order to obtain a smooth surface and to prevent the organic liquid wherein the photoconductive substance is dissolved from penetrating within the paper sheet. This coating, however, must not prevent the carrying-off of the electrons from the exposed image areas during the irradiation. Suitable coatings are for instance coatings with a thickness of 2 to $10\mu$ and composed of one or more of the macromolecular compounds described above as binding agent for the photoconductive compound.

Besides the usual paper sorts can likewise be used synthetic paper sorts such as those prepared from polyesters, from polyamide fibers or nylon-fibers or from polyacrylonitrile fibers. Before coating the photoconductive layers on such paper sheets, the latter are preferably impregnated with substances enhancing their conductivity, for instance polycaprolactam, the polyester of 1-chloro-3-aminobenzene-4,6-disulphochloride, a copolyamide of hexamethylenediamine, caprolactam, adipic acid and sebacic acid, N-methylene polyhexamethylene adipamide or polyamides.

For the preparation of the electrophotographic material according to the present invention various techniques can be applied when coating the support with a photoconductive layer.

In practice, the compounds according to the above general formula either alone or together with other additives such as for instance binding agents, compounds which enhance the sensitivity etc. are preferably first dissolved or dispersed in a suitable organic solvent such as for instance benzene, acetone, methylene chloride, dioxane, dimethylformamide or glycol monomethylether, or in a mixture of two or more of such solvents. The solution or dispersion thus obtained is uniformly spread on a surface of a suitable support, for instance by centrifuging, spraying, brushing or coating whereafter the layer formed is dried in such a way that a uniform photoconductive layer is formed on the surface of the support.

A particularly interesting method for applying to a support a photoconductive layer containing little or no binding agent is as follows: a solution of the photoconductive substance is applied to the support in such a way that a micro-crystalline layer is formed; for this purpose is preferably used a heated, strongly concentrated solution of the photoconductor in a strong organic solvent and the layer formed is preferably quickly dried for instance in a hot air current or by action of infrared radiation.

Electrophotographic materials according to the present invention can be used in any of the different techniques whatever which are based on the exposure and the discharge of an electrostatic charge provided in or on a photoconductive layer.

The electrostatic charging of the photoconductive layer according to the present invention can be effected according to one of the methods known in electrophotography, for instance by friction with a smooth material, by friction with a material possessing a high electric resistivity such as for instance a cylinder coated with polystyrene, by corona discharge, by contact charge or by discharge of a capacitor.

The electrophotographic material is thereafter imagewise exposed to a suitable electromagnetic radiation whereby the radiated parts of the layer are image-wise discharged and an electrophotographic latent image is obtained. The electrostatic latent image formed is then converted into a visible image either on the electrophotographic material whereon the latent image was formed, or on a material onto which the electrostatic latent image was transferred for instance by application of the method as described in the Belgian Patent No. 529,234.

The conversion of the original or transferred latent image into a visible image can occur according to one of the techniques known in electrophotography wherein use is made of the electrostatic attraction or repulsion of finely divided colored substances which for instance are present in a powder or powder mixture, in an electric insulating liquid (for instance in the form of suspension) or in a gas (for instance in the form of aerosol), or of finely divided colored liquid drops which are for instance present in an electrically insulating liquid (for instance in the form of dispersion) or gas (e.g. in the form of aerosol).

By suitable choice of the sign of the charge of the developing powder or developing liquid a negative or positive print can be obtained at will from any original. If both the printing material and developing powder or developing liquid bear the same charge sign, the powder will only adhere to the discharged areas and a print (positive/positive) is obtained with the same image value as the original. If the sign of the material and of the developing powder or developing liquid is different, the image values become reversed (negative/positive).

Besides development according to the methods generally known in the electrophotography, also other techniques can successfuly be used for instance by applying the method according to the copending patent application Serial No. 856,357 for "Development of Electrostatic Latent Images," filed December 1, 1959, now abandoned, and the copending patent application Serial No. 741,017 for "Electrophotographic Process," filed June 10, 1958, now Patent No. 3,083,117.

If a colored powder was used for making visible the latent image, the visible image obtained can, if necessary, be fixed according to one of the methods known in electrophotography, e.g. by heating, or it can be transferred onto another support, for instance according to the method described in the British Patent 658,699 (Canadian Patent 518,430) and fixed threon.

Evidently, the present invention is by no means limited to one or the other particular embodiment as regards the use of the new electrophotographic materials, and the exposure technique, the charging method, the transfer (if any), the developing method, and the fixing method as well as the materials used in these methods can be adapted to the necessities.

Electrophotographic materials according to the present invention can be applied in reproducing techniques wherein different kind of radiations, electromagnetic radiations as well as nuclear radiations are used. For this reason, it should be pointed out that although the invention is mainly intended for being applied in connection with methods comprising an exposure, the term "electrophotography" wherever appearing in the description and the claims, must be broadly understood and comprises both xerography and xeroradiography.

The following examples will illustrate the invention without limiting it.

*Example 1*

A paper of 90 g./sq. m. covered with an aluminum sheet of a thickness of $8\mu$ is coated with a layer from the following solution:

| | |
|---|---|
| Lustrex X–820 | g-- 5 |
| Acetone | cm.$^3$-- 50 |
| Dimethylformamide | cm.$^3$-- 50 |
| Compound 41 of Table 1 | g-- 5 |
| Bleu Zapon Solide 3G (C.I. 51005) | mg-- 10 |

Lustrex X–820 is a trademark for a synthetic polymer containing carboxyl groups manufactured by Monsanto Chemical Company, St. Louis, Mo.

The dried layer has a thickness of $8\mu$. This material is charged with a corona and exposed through a diapositive for 8 seconds with a 100 watt lamp at a distance of 10 cm. The material is developd with a mixture of resin carbon black powder and iron powder. Also by using other suited developing powders, i.a. those described in the U.S. Patents 2,659,670, 2,753,308, 2,638,416, 2,786,440 and in the Belgian Patent 541,668, similar favorable results can be attained.

After fixing the powder image obtained by a short heating at circa 150° C., a clear reproduction of the original is obtained.

*Example 2*

A non-brushed aluminum sheet is coated with a layer from the following solution:

| | |
|---|---|
| Hostalit CAM | g-- 5 |
| Acetone | cm.$^3$-- 50 |
| Compound 40 of Table 1 | g-- 5 |
| Methylene blue (free of zinc chloride) (C.I. 52015) | mg-- 10 |
| Dimethylformamide | cm.$^3$-- 50 |

Hostalit CAM is a trademark for a vinyl chloride copolymer manufactured by Farbwerke Hoechst A.G., Frankfurt am Main. The dried layer has a thickness of $7\mu$ and adheres very strongly to the aluminum. The electrophotographic layer thus obtained is charged with a negative corona, exposed for 14 seconds through a diapositive with a 100 watt lamp at a distance of 10 cm.

The latent image obtained is developed with a mixture of 100 g. of iron filing and 5 g. of Toner P648

(trademark for a xerographic developing dyestuff manufactured by General Photo Products Co. Inc., Chatham, N.J.), and fixed by heating. A very strong image with a very good dissolving powder is obtained. The exposed areas of the light-sensitive layer are now washed away with ethyl lactate and the blank aluminum image parts are rendered ink-repellent by a short moistening with 1.5% sodium hydroxide. Without further treatment, the printing plate thus obtained can now be tightened on the offset machine. The image parts consisting of solidified Toner immediately absorb ink.

*Example 3*

A photographic baryta paper is coated with a layer from the following solution:

| | |
|---|---|
| Mowilith 50 | g 5 |
| Methylene chloride | cm.³ 50 |
| Compound 6 of Table 1 | g 5 |
| Crystal Violet (C.I. 42555) | mg 10 |
| Dimethylformamide | cm.³ 50 |

Mowilith 50 is the trademark for a polyvinyl acetate resin manufactured by Farbwerke Hoechst A.G., Frankfurt am Main. The dried layer has a thickness of 8µ and after a negative charging is exposed for 8 seconds through a diapositive with a 100 watt lamp at a distance of 10 cm.

After suited powder development of the exposed material and fixation by exposing it for a few seconds to carbon tetra chloride vapors, a clear reproduction of the original is obtained.

*Example 4*

A 50% solution in methylene chloride of the polyester of 4,4'-dicarboxydiphenyl ether and 2,2-(4,4'-dihydroxydiphenyl)-propane (prepared according to the Belgian Patent 563,173) is applied to a baryta paper. The dried layer has a thickness of 7µ. Hereto a second layer is coated from a solution obtained by dissolving, under heating, 10 g. of the compound 42 of Table 1 in a mixture of 50 cm.³ of dimethylformamide and 50 cm.³ of methylene chloride, by adding thereto 1.2 cm.³ of a 1% solution of Fuchsine (C.I. 42510) and by drying it afterwards. The whole thickness is 11µ. After charging with a negative corona, the material obtained has a charge of 600 volts. This light-sensitive material, together with a typewritten letter is now exposed according to the reflex method for 10 seconds with a 100 watt lamp at a distance of 10 cm. After powder development as in Example 2, the powder image formd is electrostatically transferred onto writing paper and fixed. A strong copy of the original is obtained.

*Example 5*

An aluminum sheet is immersed in a solution at 40° C. of 5 g. of the compound 1 of Table 1 in a mixture of 100 cm.³ of dimethylformamide and 40 cm.³ of acetone. Immediately thereafter the wet sheet is dried with an infrared lamp. The dried layer has a thickness of 3µ and adheres very strongly to the aluminum.

This material is now charged with a negative corona and exposed for 1.5 sec. through a diapositive with a 100 watt lamp at a distance of 10 cm. The latent image formed is developed with a mixture of 100 parts of iron films and 5 parts of Toner P648.

After fixing the powder image by heat, the exposed image parts of the plate are washed away with a mixture consisting of 2 parts by volume of ethanol and 1 part of water. By a short maintaining with a 2.5% sodium hydroxide solution, the blank aluminum image parts are made hydrophilic. The printing plate thus obtained can immediately be tightened on the offset machine. The image parts consisting of solidified Toner immediately absorb ink.

*Example 6*

A photographic baryta paper is coated with a layer from the following solution:

| | |
|---|---|
| Ethylcellulose with a viscosity of 100 cps. | g 6 |
| Acetone | cm.³ 90 |
| Butylacetate | cm.³ 10 |

The dried layer has a thickness of 5µ. Hereto is applied a second layer from the following solution at 30° C.:

| | |
|---|---|
| Compound 23 of Table 1 | g 10 |
| 1,1'-diethyl-2,2'-cyanine iodide | mg 9 |
| Methylglycol | cm.³ 70 |
| Acetone | cm.³ 30 |

After a short and rapid drying with a warm air current, the whole layer thickness amounts to 10µ. After negative charging, the light-sensitive material obtained is exposed for 3 seconds through a diapositive with a 100 watt lamp at a distance of 10 cm., developed and fixed as in Example 1. A clear reproduction of the original is obtained.

*Example 7*

A paper of 80 g./sq. m. covered with an aluminum sheet of a thickness of 8µ is coated with a layer from the following solution:

| | |
|---|---|
| Compound 20 of Table 1 | g 5 |
| Vert Bleu Celliton Solide B (C.I. 62500) | mg 6 |
| Mowilith M70 | g 5 |
| Methylene chloride | cm.³ 50 |
| Acetone | cm.³ 50 |

The dried layer has a thickness of 8µ. This material is charged negatively and exposed through a diapositive for 1.1 sec. with a 100 watt lamp at a distance of 10 cm. The latent image formed is then developed with a mixture of 100 parts by weight of glass beads and 6 parts by weight of Toner P648 and fixed by exposing the material for some seconds to carbon tetrachloride vapors. A strong copy of the original is obtained.

*Example 8*

A baryta paper is coated with a layer from the following solution:

| | |
|---|---|
| Polyester of diphenyl-p,p'-disulphonic acid and 2,2-(4,4'-dihydroxydiphenyl)-propane prepared according to the Belgian Patent 565,478 | g 10 |
| Tetrahydrofurane | cm.³ 30 |
| Methylene chloride | cm.³ 70 |
| Compound 37 of Table 1 | g 5 |
| 2 - (p - dimethylaminophenyl) - 3 - phenylquinoxaline | mg 8 |

After drying, the layer thickness amounts to 8µ. The layer is rapidly and intensively radiated with infrared lamps until all the solvent is removed.

After charging with a negative corona, the material is exposed through a diapositive for 2 seconds with a 100 watt lamp at a distance of 10 cm., developed and fixed as in Example 2. A strong copy of the original is obtained.

*Example 9*

A baryta paper is coated with a layer from the following solution:

| | |
|---|---|
| Polyester of benzene-1,3-disulphonic acid and 2,2-(4,4'-dihydroxydiphenyl)-propane prepared according to the Belgian Patent 565,478 | g 10 |
| Methylene chloride | cm.³ 100 |

The dried layer has a thickness of 5µ. On this layer is coated a second layer consisting of the following solution:

| | | |
|---|---|---|
| Compound 4 of Table 1 | g | 10 |
| Methylglycol | cm.³ | 100 |
| Bis[1,2 - dibenzthiazolylethylene] - bis[mesomethyltrimethinecyanine]-p-tolusulphonate | mg | 10 |

The total layer thickness amounts after rapid drying to 10µ. After electrostatically charging, the material is exposed for 4 seconds with a 100 watt lamp at a distance of 10 cm. for copying a diapositive. After development and fixation such as in Example 2, a strong copy of the original is obtained.

*Example 10*

A photographic baryta paper is coated with a 10% solution in methylene chloride of the polyester of Example 9. The dried layer has a thickness of 5µ. On this layer is coated a second layer from the following solution at 35° C.:

| | | |
|---|---|---|
| Compound 27 of Table 1 | g | 10 |
| Methylglycol | cm.³ | 10 |
| Acetone | cm.³ | 90 |
| Blue Kiton A (C.I. 42052) | mg | 20 |

After rapid drying with an air current at 40° C. the total thickness of the two layers amounts to 9µ. This material is negatively charged and exposed for 3 seconds through a diapositive with a 100 watt lamp at a distance of 10 cm. The latent image formed is then developed with a mixture of 100 parts by weight of glass beads and 5 parts of a developing powder obtained by homogeneously mixing by melting into 4 g. of triphenylphosphate, 3 g. of the "Diazotypiesalz BC" (registered trademark for a diazonium compound manufactured by Farbwerke Hoechst A.G., Frankfurt am Main, and Werk Naphtolchemie Offenbach), pulverizing this mixture after solidifying and intimately mixing with 6 g. of likewise finely pulverized sodium acetate. If this developed material is now heated for a few seconds at 60° C. a strong brown-black image is formed.

*Example 11*

A baryta paper is coated with a 10% solution in methylene chloride of the polyester of isophthalic acid and 4,4'-dihydroxydiphenyl-diphenylmethane (prepared according to the Belgian Patent 563,173). The thickness of the dried layer amounts to 8µ. To this layer is applied a second layer from the following solution at 35° C.:

| | | |
|---|---|---|
| Compound 34 of Table 1 | g | 10 |
| 2,6-di-(o-hydroxybenzylidene)-cyclohexanone | mg | 10 |
| Methylglycol | cm.³ | 20 |
| Acetone | cm.³ | 80 |
| 1,3,5-trihydroxybenzene | g | 1 |

The whole thickness of the dried layers amounts to 12µ. This obtained material is electrostatically charged, exposed for 1.7 sec. and finally developed and fixed as described in Example 10. A clear copy with black image-tone is obtained.

*Example 12*

Paper of 90 g./sq. m. is coated with a solution of 10 g. of the polyester of 2,2-(4,4'-dihydroxy-diphenyl)-propane and furane dicarboxylic acid-2,5 in 100 cm.³ of methylene chloride. The dried layer has a thickness of 7µ. To this layer is applied a second layer from the following solution at 40° C.:

| | | |
|---|---|---|
| Compound 12 of Table 1 | g | 10 |
| Acetone | cm.³ | 100 |
| Alpha-naphthol | g | 1 |
| Janus Green B (C.I. 11050) | mg | 12 |

After rapid drying with infrared lamps the layer has a thickness of 4µ. The light-sensitive material obtained is then treated in the same way as in Example 10 but with an exposure time of only 0.8 second. A strong copy with brown image-tone is obtained.

*Example 13*

A solution of 5 g. of Pioloform BW (registered trademark for a butyraldehyde-acetal of polyvinylalcohol manufactured by Wacker-Chemie G.m.b.H., Munich), in 100 cm.³ of acetone is applied to a baryta paper and dried. The layer obtained has a thickness of 4µ. To this layer is applied a second layer from the following solution:

| | | |
|---|---|---|
| Compound 14 of Table 1 | g | 10 |
| 3 - ethyl-4-dicyanmethylidene-5-(3' - ethylbenzthiazoline-2'-ylidene)-thiazolid-2-one dimethine - merocyanine | mg | 8 |
| Methylglycol | cm.³ | 80 |
| Acetone | cm.³ | 20 |

After drying, the whole thickness of the 2 layers amounts to 9µ. After electrostatically charging, the material is exposed for 1 second with a 100 watt lamp at a distance of 10 cm. for copying a diapositive. After development and fixation as in Example 2, a strong copy of the original is obtained.

*Example 14*

A paper of 80 g./sq. m. covered with an aluminum sheet of 10µ thickness is coated with a layer from the following solution:

| | | |
|---|---|---|
| Compound 21 of Table 1 | g | 5 |
| 1,1'-diethyl-4,4'-carbocyanine iodide | mg | 6 |
| Polyester of adipic acid and 2,2'-(4,4'-dihydroxydiphenyl)-propane | g | 5 |
| Methylene chloride | cm.³ | 50 |
| Dimethylformamide | cm.³ | 50 |

The above-mentioned polyester is prepared by heating together 15.93 g. of the diacetate of 2,2'-(4,4'-dihydroxyphenyl)-propane, 7.31 g. of adipic acid and 8 mg. of tetrabutyl-orthotitanate for 90 minutes at 255° C., whilst a slow current of nitrogen is led through the reaction mixture and whilst the acetic acid formed is distilled off. Afterwards, heating is continued for 3 h. under vacuum of about 1 mm. Hg. The intrinsic viscosity of the polymer prepared, measured in tetrachloroethane, amounts to 0.15 dl./g.

The thickness of the dried layer amounts to 8µ. After positive corona charging a microfilm image is projected onto the material obtained. For a 4 times linear enlargement an exposure time of 18 seconds is required. The latent image formed is developed with a mixture of glass beads and Graph-O-Fax Toner W5 (registered trademark for a xerographic developing dyestuff manufactured by Philip A. Hunt Co., Palisades Park, N.J.), in a 25:1 proportion and then fixed by heating for a short while.

We claim:

1. A photographic reproduction process which comprises exposing an electrostatically charged photoconductive insulating layer to a light image whereby the light-struck area is discharged, and developing the resulting electrostatic image with an electroscopic material, said layer comprising a compound having the formula:

$$\begin{array}{c} N \text{\textemdash\textemdash} C\text{\textemdash} R_1 \\ \| \quad\quad \| \\ R_3\text{\textemdash} C \quad\quad C\text{\textemdash} R_2 \\ \diagdown \diagup \\ X \end{array}$$

wherein X is an imino group, $R_1$ and $R_2$ are each aryl groups and $R_3$ is a member selected from the group consisting of hydrogen, an aryl group and a heterocyclic group.

2. The electrophotographic copying process of claim 1 wherein the charged photoconductive insulating layer contains compounds which provide an increase of the sensitivity of said layer to visible light.

(References on following page)

References Cited by the Examiner

UNITED STATES PATENTS

| | | | |
|---|---|---|---|
| 2,297,691 | 10/1942 | Carlson | 96—1 |
| 2,550,321 | 4/1951 | Ackerman | 252—301.2 |
| 2,726,246 | 12/1955 | Troshen | 260—309 |
| 2,985,661 | 5/1961 | Hein | 252—301.2 |

FOREIGN PATENTS

| | | |
|---|---|---|
| 562,336 | 5/1958 | Belgium. |
| 563,045 | 6/1958 | Belgium. |
| 580,075 | 7/1959 | Canada. |
| 1,232,805 | 10/1960 | France. |
| 1,177,936 | 12/1958 | France. |
| 1,060,713 | 7/1959 | Germany. |
| 572,404 | 1/1958 | Italy. |
| 574,620 | 7/1957 | Italy. |

OTHER REFERENCES

Imidazoles, Preliminary Data Bulletin, Houdry Process Corporation, Chemicals Department, April 8, 1959 (12 pages).

Lyons et al.: J. Chem. Soc. (1957), 3648–3668.

Siegrist: "Das Papier," 8, Jahrgang (8th year), Heft (vol. 7/8), of April 1954, pages 109–120 (32 pages).

Winslow et al.: J.A.C.S. 77, 4751–6 (1955).

NORMAN G. TORCHIN, *Primary Examiner.*

HAROLD N. BURSTEIN, PHILIP E. MANGAN, A. LOUIS MONACELL, *Examiners.*

J. E. ALIX, C. E. VAN HORN, *Assistant Examiners.*